United States Patent [19]
Busboom et al.

[11] Patent Number: 5,865,020
[45] Date of Patent: Feb. 2, 1999

[54] LAWN MOWER HAVING A LOW CENTER OF GRAVITY

[75] Inventors: Garry W. Busboom; John C. Crumrine, both of Beatrice, Nebr.

[73] Assignee: ExMark Mfg. Co., Beatrice, Nebr.

[21] Appl. No.: 899,620

[22] Filed: Jul. 24, 1997

Related U.S. Application Data

[63] Continuation-in-part of Ser. No. 559,575, Nov. 16, 1995, abandoned.

[51] Int. Cl.$^6$ .................................................. A01D 67/00
[52] U.S. Cl. ........................................... 56/320.1; 56/10.8
[58] Field of Search ..................... 56/10.8, 11.7, 56/11.8, 11.6, 320.1, DIG. 22, DIG. 6

[56] References Cited

U.S. PATENT DOCUMENTS

| | | | |
|---|---|---|---|
| 4,120,136 | 10/1978 | Rose .............................. | 56/DIG. 22 X |
| 4,159,613 | 7/1979 | Knudson et al. ............. | 56/DIG. 22 X |
| 4,187,924 | 2/1980 | Deschamps .................... | 56/DIG. 22 X |
| 4,787,195 | 11/1988 | Wenzel ..................... | 56/11.1 |
| 4,920,734 | 5/1990 | Wenzel ..................... | 56/11.1 |
| 4,941,864 | 7/1990 | Bottum ..................... | 474/133 |
| 4,958,484 | 9/1990 | Busboom .................... | 56/255 |
| 4,967,543 | 11/1990 | Scag et al. ................. | 56/10.8 |
| 5,077,959 | 1/1992 | Wenzel ..................... | 56/11.1 |
| 5,127,215 | 7/1992 | Wenzel ..................... | 56/161 |
| 5,129,217 | 7/1992 | Loehr ........................ | 56/13.6 |
| 5,155,985 | 10/1992 | Oshima et al. ............. | 56/10.8 |
| 5,167,108 | 12/1992 | Bird ........................... | 56/11.8 X |
| 5,210,998 | 5/1993 | Hojo et al. .................. | 56/320.1 X |
| 5,239,810 | 8/1993 | Gugel ........................ | 56/10.8 |
| 5,249,411 | 10/1993 | Hake ......................... | 56/11.6 |
| 5,251,429 | 10/1993 | Minato et al. .............. | 56/17.2 |
| 5,337,543 | 8/1994 | Kitamura et al. ........... | 56/10.8 |
| 5,355,661 | 10/1994 | Tomiyama .................. | 56/10.8 |
| 5,361,566 | 11/1994 | Hohnl .......................... | 56/DIG. 22 X |
| 5,518,079 | 5/1996 | Zvolanek .................... | 180/19.1 |

OTHER PUBLICATIONS

Walker Mowers Brochure "Fast, Easy, Beautiful Mowing™" Dec. 1996.

*Primary Examiner*—Thomas B. Will
*Assistant Examiner*—Victor Batson
*Attorney, Agent, or Firm*—Zarley, McKee, Thomte, Voorhees & Sease; Dennis L. Thomte

[57] ABSTRACT

A riding lawn mower having a low center of gravity comprising a frame having a pair of drive wheels rotatably mounted at the rearward end thereof and having a caster wheel supported mower deck at the forward end thereof. A plurality of cutting blades are disposed within the mower deck. An engine support deck is positioned rearwardly of the operator's station on the mower and is disposed in a plane closely adjacent the rotational axis of the rear drive wheels. A vertically disposed rotatable shaft is mounted in the rearward end of the mower deck and has its upper end disposed above the top wall of the mower deck. An upper pulley is mounted on the rotatable shaft above the top wall of the mower deck and is connected to the spindles of the cutting blades by a first belt. A lower pulley is mounted on the rotatable shaft below the upper pulley and is substantially disposed in the same plane as the top wall of the mower deck. A second belt interconnects the lower pulley with the engine of the mower through a pair of idler pulleys.

2 Claims, 5 Drawing Sheets

5,865,020

LAWN MOWER HAVING A LOW CENTER OF GRAVITY

CROSS-REFERENCE TO RELATED APPLICATION

This is a continuation-in-part application of application Ser. No. 08/559,575 filed Nov. 16, 1995, entitled HILLSIDE-STABLE POWERABLY-MOTIVATED LAWNMOWERS now abandoned.

BACKGROUND OF THE INVENTION

1. Field of the Invention

This invention relates to a lawn mower and more particularly to a lawn mower having a low center of gravity so that the lawn mower will be relatively stable on hillsides or the like.

2. Description of the Related Art

Lawn mowers, whether they are the riding type or of the walk-behind type, normally employ a mower deck which is positioned forwardly of an engine mounted on a wheeled frame with the engine being provided to propel the lawn mower over the lawn and to drive the cutting blades located in the cutting deck. When the mower is of the riding type, the engine is normally positioned rearwardly of an operator's seat provided on the wheeled frame. In the prior art riding mowers, the methods of mounting the engine on the wheeled frame and the connection of the engine drive shaft and the cutting blades resulted in mowers wherein the center of gravity thereof was such that it could create a problem when the mower was being used on hillsides or the like.

SUMMARY OF THE INVENTION

A riding lawn mower having a low center of gravity is described and which comprises a frame having a pair of drive wheels rotatably mounted thereon at the opposite sides thereof adjacent the rearward end thereof. A mower deck is supported by the frame means at the forward end thereof with the mower deck comprising a top wall, a front wall, a back wall, and first and second side walls. A plurality of cutting blades are disposed within the mower deck with the mower deck being supported by caster wheels or the like at the forward end thereof. An operator's station is provided on the frame forwardly of the rearward end thereof and forwardly of a horizontally disposed engine support deck which is positioned at the rearward end of the frame. The engine support deck is disposed in a plane closely adjacent the rotational axis of the drive wheels and has an engine mounted thereon which has a rearwardly extending rotatable drive shaft having a drive pulley mounted thereon. A pair of horizontally spaced-apart idler pulleys are rotatably mounted on the frame about a horizontal axis which is substantially transverse with respect to the rotational axis of the engine drive shaft. Each of the cutting blades has a rotatable spindle extending upwardly through the top wall of the mower deck with the spindles having a pulley mounted thereon above the top wall of the mower deck. A first, vertically disposed shaft is rotatably mounted in the mower deck at the rearward end thereof and has an upper end positioned above the top wall of the mower deck. An upper pulley is mounted on the upper end of the first shaft above the top wall of the mower deck for rotation with the first shaft. A lower pulley is mounted on the first shaft, for rotation therewith, below the upper pulley. The lower pulley is substantially disposed in the same plane as the top wall of the mower deck. A first belt means interconnects the upper pulley with the pulleys on the spindles. A second belt means extends around the drive pulley of the engine, the idler pulleys, and the lower pulley for supplying driving power to the cutting blades. The unique positioning of the lower pulley with respect to the mower deck top wall and the belt connection of the engine thereto lowers the center of gravity of the mower to provide a stable mower.

It is therefore a principal object of the invention to provide a riding mower having a low center of gravity.

Still another object of the invention is to provide a unique belt drive connection in a riding lawn mower which results in the center of gravity of the mower being lowered.

These and other objects will be apparent to those skilled in the art.

DESCRIPTION OF THE PREFERRED EMBODIMENT

Figure 1:
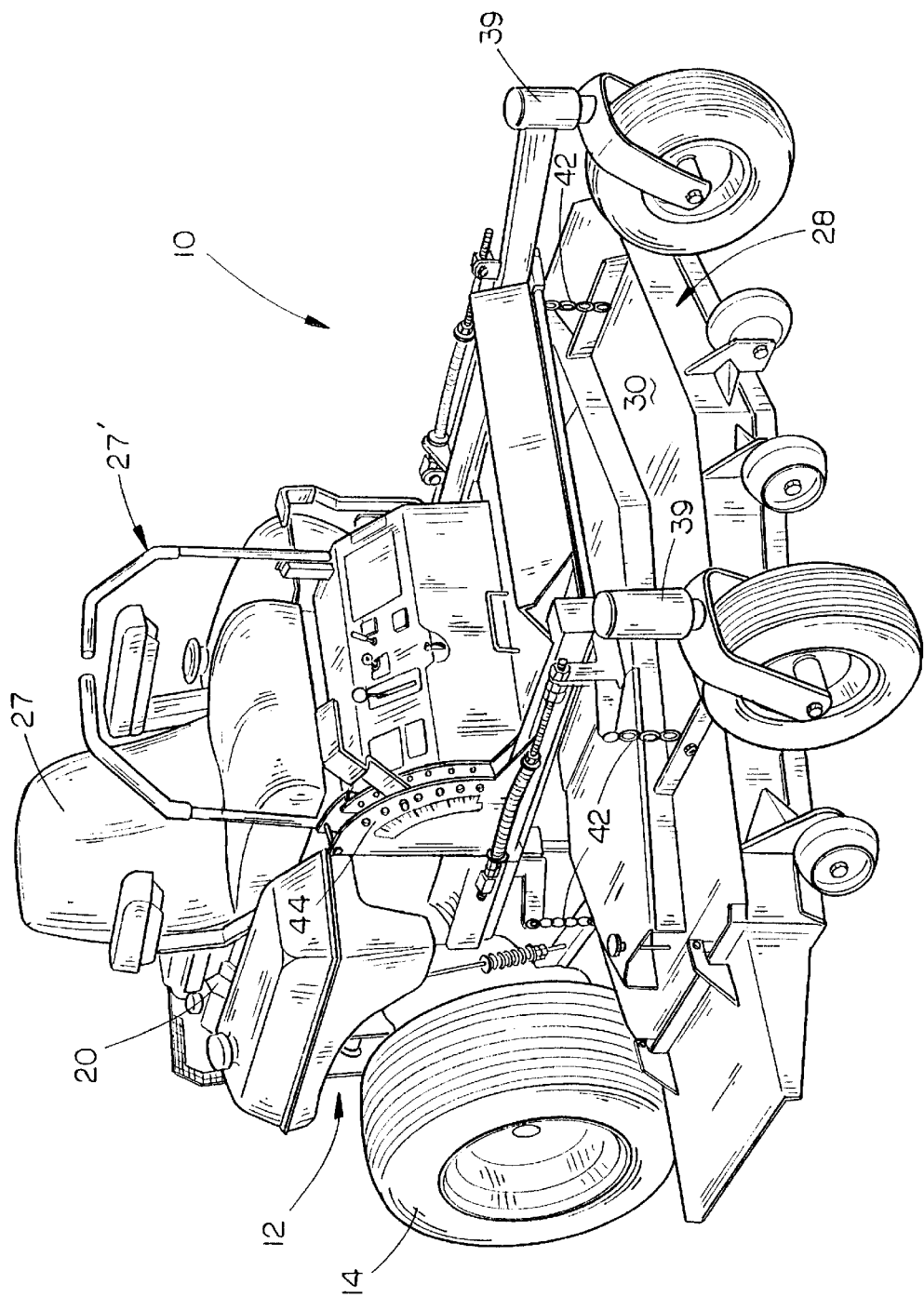
FIG. 1 is a front perspective view of the riding lawn mower of this invention.
Figure 2:
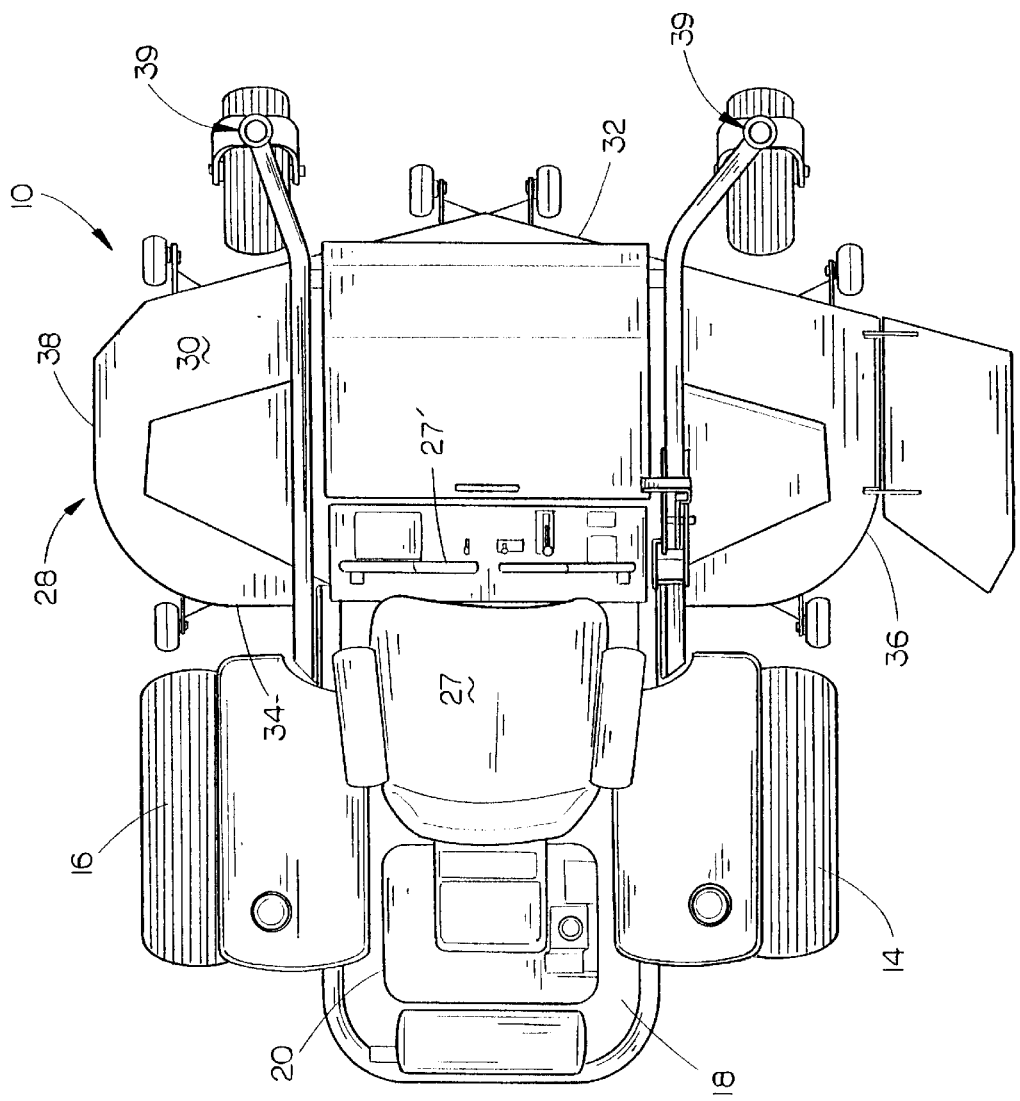
FIG. 2 is a top view of the mower of FIG. 1.
Figure 3:
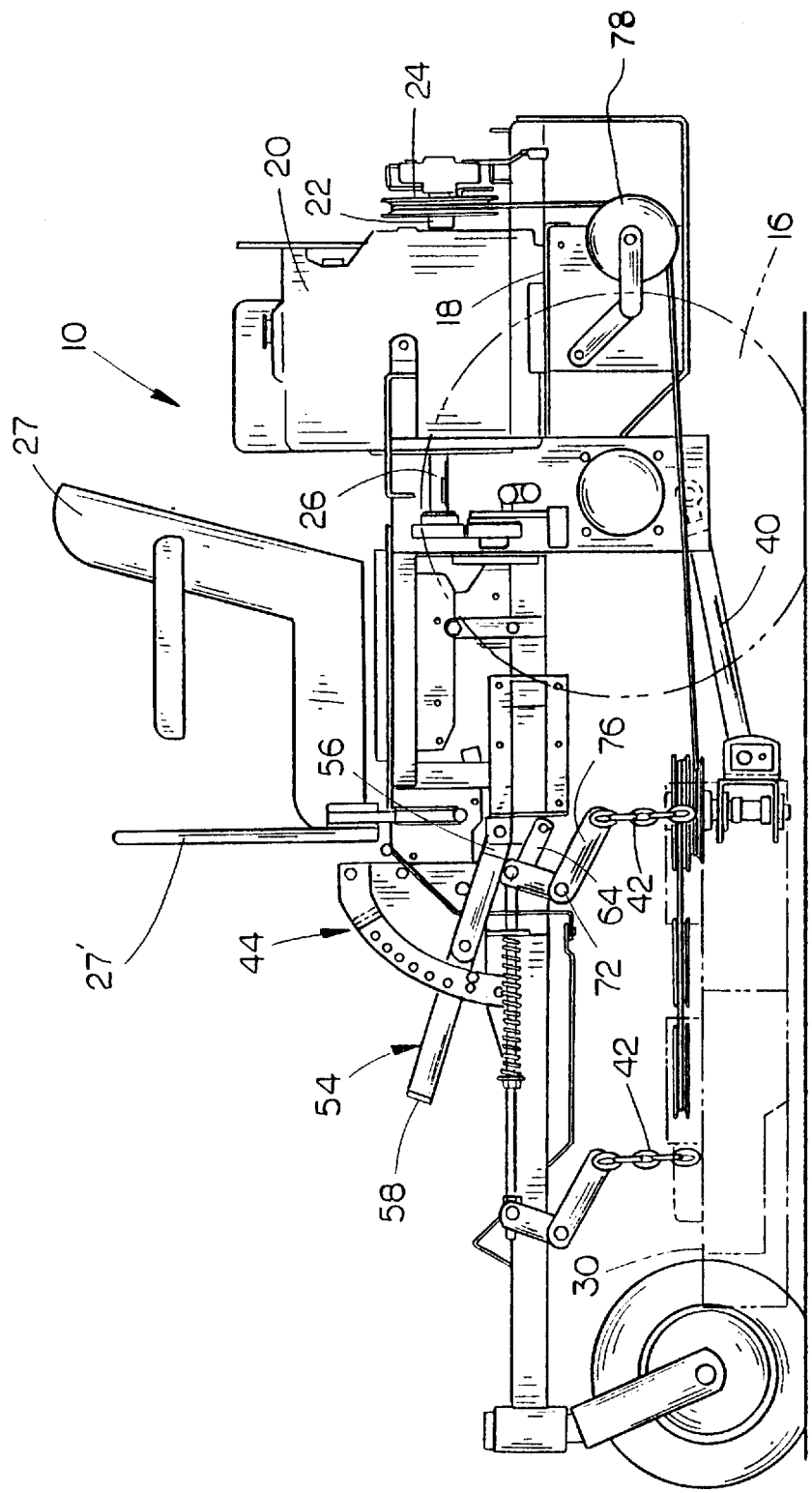
FIG. 3 is a side elevational view of the mower of FIGS. 1 and 2.

The mower of this invention is referred to generally by the reference numeral 10 and is seen to be a riding lawn mower in the drawings. Although the invention described herein is ideally suited for use with a riding mower, it is believed that the invention described herein also has applicability with respect to walk-behind mowers. Mower 10 includes a frame means 12 having a pair of drive wheels 14 and 16 positioned on opposite sides of the frame means 12 at the rearward end of the mower. Mower 10 includes an engine support deck 18 which is disposed closely adjacent the rotational axes of the wheels 14 and 16, as best seen in FIG. 3. An internal combustion engine 20 is mounted on engine support deck 18 and has a rearwardly extending drive shaft 22 upon which is mounted a drive pulley 24 in the form of an electric clutch. Engine 20 also includes a forwardly extending drive shaft 26 which is operatively connected to a pair of hydraulic pumps which are operatively connected to hydraulic motors operatively connected to the drive wheels 14 and 16, respectively. Mower 10 also includes an operator's station 27 and steering controls 27'.

Mower 10 includes a mower deck 28 at the forward end thereof which includes a top wall 30, front wall 32, rear wall 34, and opposite side walls 36 and 38. Caster wheel assemblies 39 support the forward end of deck 28. A stabilizer rod assembly 40 connects the rearward end of the mower deck 28 to the frame means 12 in conventional fashion. Mower deck 28 is supported by a plurality of chain members 42 which are connected to a mower deck height control mechanism generally referred to by the reference numeral 44 to enable the mower deck to be raised or lowered with respect to the frame means 12.

Figure 5:
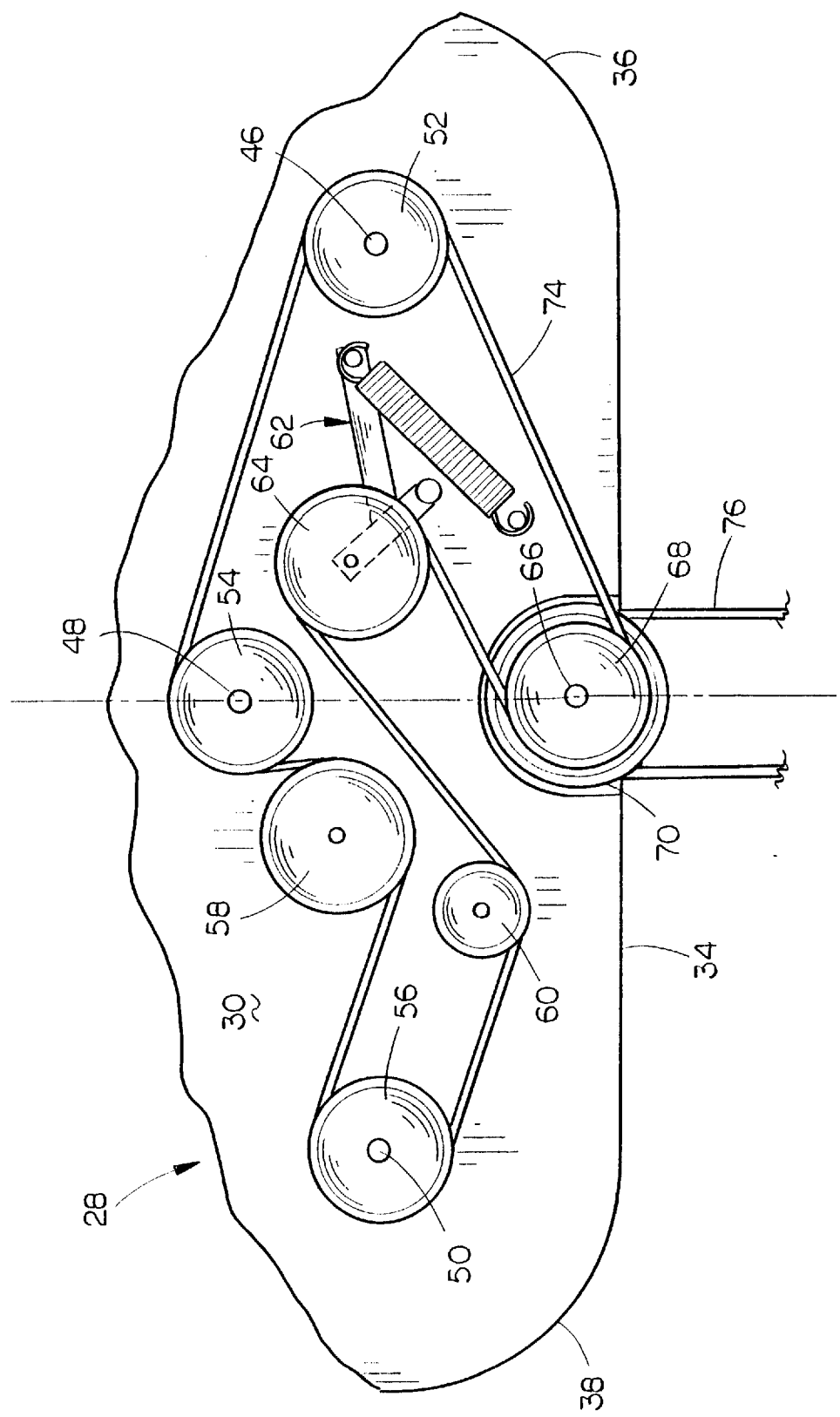
FIG. 5 is a partial top view illustrating the belt connection for the mower blades.

Mower deck 28 has drive spindles 46, 48 and 50 rotatably mounted in top wall 30 with the upper ends of the drive spindles 46, 48 and 50 being located above top wall 30 and the lower ends thereof being positioned beneath top wall 30. Cutting blades are mounted on the lower ends of the spindles 46, 48 and 50 in conventional fashion. Pulleys 52, 54 and 56 are mounted on spindles 46, 48 and 50, respectively, for rotation therewith. Idler pulleys 58 and 60 are also rotatably mounted on the mower deck, as best seen in FIG. 5. A belt tightener assembly 62 is provided which is operatively connected to idler 64.

Figure 4:
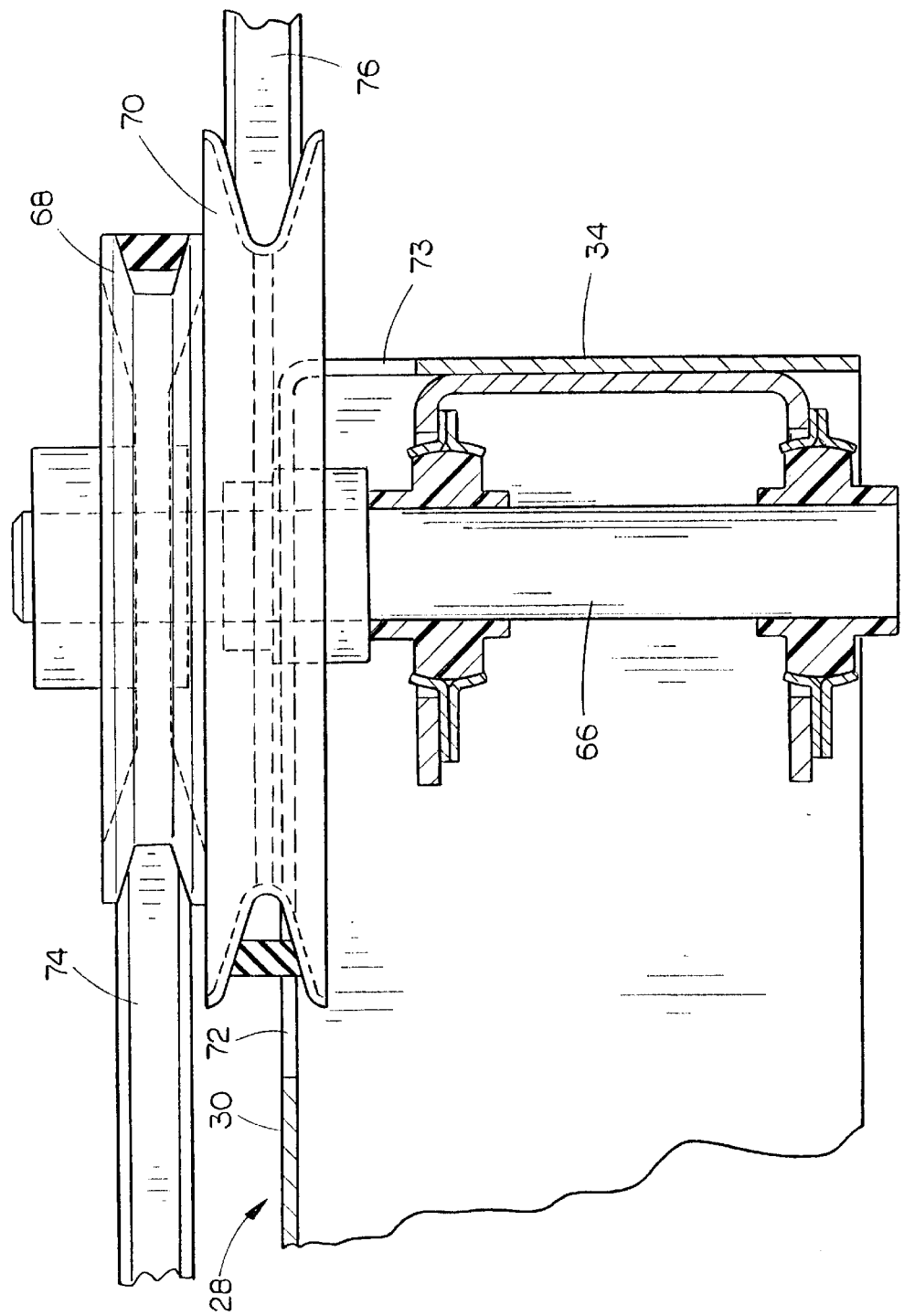
FIG. 4 is a partial sectional view.

A vertically disposed rotatable shaft 66 is mounted in the rearward end of mower deck 28 and has its upper end disposed above the top wall 30, as illustrated in FIG. 4. An upper pulley 68 is mounted on the upper end of shaft 66 above top wall 30 of mower deck 28. A lower pulley 70 is mounted on the shaft 66 below pulley 68 with the lower pulley 70 being substantially disposed in the same plane as the top wall of the mower deck 28. Top wall 30 is provided with a rearwardly presented opening 72 which communicates with opening 73 formed in rear wall 34 to enable pulley 70 to be substantially disposed in the same plane as top wall 30.

Drive belt 74 extends around upper pulley 68 and the various drive pulleys and idler pulleys on the mower deck, as best illustrated in FIG. 5. Belt 76 extends around pulley 70 and extends rearwardly, as seen in FIG. 3. Belt 76 extends around a pair of horizontally spaced-apart idler pulleys 78 and extends around the pulley 24 on shaft 22. The rotational axis of each of pulleys 78 is disposed transversely with respect to the rotational axis of shaft 22.

Thus, upon the actuation of shaft 22 and the electric clutch drive pulley 24, the cutting blades will be actuated. The actuation of shaft 26 also causes the conventional hydraulic pumps to be actuated so that the mower may be propelled over the area to be mowed. The relationship of the various components is extremely important. The fact that the lower pulley 70, which is operatively connected to the drive pulley 24 on the engine 20, is disposed in substantially the same plane as the top wall 30 of the mower deck 28 is quite important in that it permits the engine to be lowered on the frame means so that the center of gravity of the mower will be lowered which increases the safety of the mower on hills or the like. If the drive pulley of the engine was connected to a pulley positioned above the mower deck, the engine would obviously have to be raised on the frame means a like amount to enable the belt 76 to efficiently interconnect the same.

Thus it can be seen that the invention accomplishes at least all of its stated objectives.

We claim:

1. A riding lawn mower, comprising:

a frame means having rearward and forward ends and opposite sides;

first and second drive wheels rotatably mounted on said frame means at the opposite sides thereof;

an operator's station provided on said frame means forwardly of the rearward end thereof;

a mower deck, having rearward and forward ends, supported by said frame means at the forward end thereof;

said mower deck comprising a top wall, a front wall, a back wall, and first and second side walls defining a downwardly directed opening;

said top wall of said mower deck having top and bottom surfaces;

a plurality of cutting blades rotatably disposed within said mower deck;

each of said cutting blades having a rotatable spindle extending upwardly through said top wall of said mower deck;

each of said spindles having a pulley mounted thereon above said top wall of said mower deck;

said frame means having a horizontally disposed engine support deck provided thereon at its said rearward end;

said engine support deck being disposed in a plane closely adjacent the rotational axes of said first and second drive wheels;

a first, vertically disposed shaft rotatably mounted in said mower deck at the rearward end thereof and having an upper end positioned above said top wall of said mower deck;

an upper pulley mounted on said upper end of said first shaft above said top wall of said mower deck for rotation with said first shaft;

a lower pulley mounted on said first shaft, for rotation therewith, below said upper pulley;

a first belt means interconnecting said upper pulley with the pulleys on said spindles;

an engine mounted on said engine deck and having a horizontally disposed, rearwardly extending, rotatable drive shaft;

a drive pulley mounted on said rearwardly extending drive shaft;

first and second idler pulleys rotatably mounted on said frame means about a horizontal axis which is substantially transverse with respect to the rotational axis of said engine drive shaft;

and a second belt means extending around said drive pulley, said idler pulleys, and said lower pulley for supplying driving power to said cutting blades;

said top wall of said mower deck having an opening formed in its rearward end which rotatably receives said lower pulley and which at least partially receives said second belt means extending from said drive pulley.

2. The riding lawn mower of claim 1 wherein said lower pulley is substantially disposed in the same plane as said top wall of said mower deck.

\* \* \* \* \*